United States Patent Office 3,215,134
Patented Nov. 2, 1965

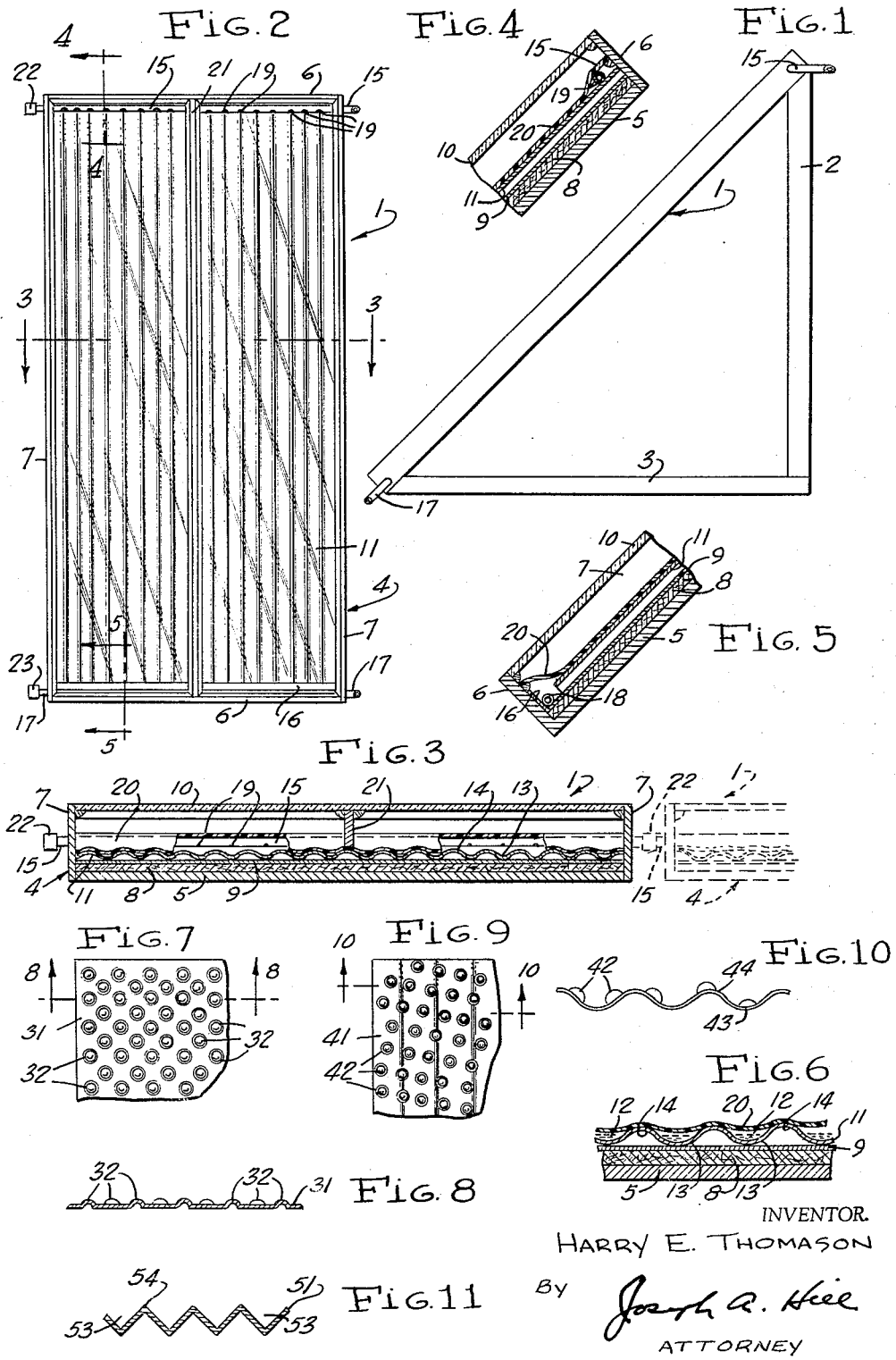

---

3,215,134
SOLAR HEAT COLLECTOR
Harry E. Thomason, 7354 Walker Mill Road SE.,
District Heights, Md.
Continuation of application Ser. No. 731,064, Apr. 25, 1958, now Patent No. 3,145,707, dated Aug. 25, 1964.
This application Aug. 24, 1964, Ser. No. 391,816
3 Claims. (Cl. 126—271)
(Granted under Title 35, U.S. Code (1952), sec. 266)

The invention described herein may be manufactured and used by or for the Government for governmental purposes without the payment to me of any royalty thereon.

This application is a continuation of my copending application Serial No. 731,064, filed April 25, 1958 and issued as Patent No. 3,145,707, August 25, 1964.

The present invention relates to improvements in solar heat collectors, and particularly the type that may be used both for collecting heat from solar radiation and for dissipating heat when not receiving solar heat, such as at night, or by turning the heat collector (dissipator) away from the sun.

Among the various known heat collectors are structures employing a black insulating base, a glass cover spaced an inch or so thereabove, and black fluid-carrying piping between the glass and the black base, which are used effectively in southern areas of the United States for heating water. These devices are sometimes constructed with the fluid-carrying piping zig-zagging in convolutions in a plane requiring many flow-restricting elbows and many lineal feet of piping her hundred square feet of collector surface, and resulting in very expensive construction as a result of both the cost of the piping and the labor cost. Inefficiencies also result from excessive spacing of the convolutions which permits radiation of much of the solar heat back to the atmosphere. Alternatively, these devices are sometimes constructed in sandwich fashion with the heat collecting fluid running between spaced metal sheets which may be parallel or crimped in imitation of tubing, but still require excessive amounts of copper and labor and still have a high ratio of fluid to heat absorbing metal.

Other existing solar heaters employ light and heat condensing lenses or reflectors to concentrate and localize the sun's light and heat, but such lenses or reflectors are extremely expensive, especially when it is desired to collect solar heat from an area of several hundreds of square feet.

A further type of existing solar heater has the heat conducting fluid contained directly between the insulated base and the transparent cover, or between a black metal collector and the transparent cover, in such a way that the transparent cover also constitutes one wall to a fluid container. This construction is not only expensive but lends itself readily to trouble because a broken or loose transparent cover, usually glass, permits the heat conducting fluid to be leaked or spilled, rendering the device inoperative. Therefore, this type device requires expensive and troublesome liquid sealing for the base, sides, and edges and for the transparent top. Since areas of hundreds of square inches are involved, the glass used must be sufficiently thick and free of flaws and the glass retaining means must be sufficiently strong to withstand contained pressures of two or three pounds per square inch over fairly large panes.

Many other types of solar heating devices are known, but with limitations and disadvantages so as to render them impractical except for very limited and specialized application. Most of the solar heaters are very ineffective and practically worthless for dissipating heat, and are therefore not reversible in operation.

The present invention, directed to obviating many of the limitations of the solar heaters described, simplifies and lowers the cost of construction, raises efficiency and is substantially trouble-free in use and operation. Additionally, the present device is readily adaptable to use as a heat-dissipating device to permit service where it is desirable to alternately collect heat and dissipate heat.

Another object of the invention is to provide an improved solar heat collector having a low ratio of heat-absorbing fluid to area of surface exposed to solar radiation so as to obtain a maximum heat accumulation per unit volume of fluid used.

Other objects and advantages of the invention will be apparent as the description proceeds and the features of novelty will be pointed out in particularity in the appended claims.

Briefly, in accordance with this invention, there is provided a solar heat collector including solar heat collector units which which may be used singly or in multiples. The units may be mounted on any movable support as, for example, one designed to permit tracking of the sun, or may be mounted on a fixed structure or built into the roof of a building. Generally, the units include a box with a transparent protecting cover, a layer of insulation on the interior bottom of the box covered by a layer of reflecting foil and a heat collecting metallic sheet having an irregular and blackened upper surface supported by a second transparent cover intermediate the sheet and protecting cover, the intermediate cover preferably being flexible and installed so as to droop against the heat collecting sheet. The device is also provided with a fluid system including a distribution pipe at one end of the box having small ports regularly spaced along its length and a fluid trough parallel to the pipe at the other end of the box so that fluid may be introduced through the pipe to be discharged to run in small quantities along many paths across the heat collecting sheet under the intermediate flexible transparent cover and into the trough. This arrangement provides for a low ratio of volume of fluid to area of heat collecting sheet and for an even distribution of the fluid volume to unit area of heat collecting sheet. The invention also provides modified heat collecting sheets providing various means of controlling the paths of the heat absorbing fluid to provide for the best absorption of heat from the collecting sheet.

In the accompanying drawings, illustrating preferred embodiments of the improvements comprising the invention—

FIG. 1 is an end elevation showing the general configuration of a complete solar heat collector;

FIG. 2 is a front or face view of a heat collector unit included in FIG. 1 embodying the improvements of the instant invention;

FIG. 3 is a transverse section along the line 3—3 of FIG. 2 showing internal details of the collector unit;

FIG. 4 is a partial vertical section taken on line 4—4 of FIG. 2;

FIG. 5 is a partial vertical section taken on the line 5—5 of FIG. 2;

FIG. 6 is an enlarged fragmentary tranverse sectoin of a solar heat collector unit showing the details of features appearing in FIG. 3;

FIG. 7 is a fragmentary plan view of a modified heat collecting sheet;

FIG. 8 is a section of the heat collecting sheet substantially on the line 8—8 of FIG. 7;

FIG. 9 is a fragmentary plan view of a further modification of the heat collecting sheet;

FIG. 10 is a section of the heat collecting sheet taken substantially on line 10—10 of FIG. 9; and FIG. 11 is a fragmentary section of a still further modification of the heat collecting sheet.

Referring more specifically to the drawings, a complete, self-supporting solar heat collector is illustrated in end elevation in FIG. 1 wherein the heat collector unit 1 is supported by frame members 2 and 3 at an inclination of approximately 45°, an attitude adapted to, but not necessarily the most efficacious for, the receipt of solar radiation. The unit 1 is also adaptable to mounting on a pedestal or other mount having mechanism, either hand operated or power driven, for tracking the sun to gain the maximum solar radiation or to turn the unit away from the sun when the unit is used as a radiator.

The structural details of the solar heat collector unit 1 are best illustrated in FIGS. 1 through 6. The unit 1 proper is contained by box 4 having bottom or base 5, end walls 6 and side walls 7 but no top. The interior of the bottom of the box is covered by a bed of insulation 8 to prevent loss of heat through the bottom. Insulation 8 in turn is preferably, but not necessarily, covered by a sheet of reflecting foil 9 for the purpose of reflecting upwards a maximum amount of the heat reaching it. Box 4 is provided with a transparent cover 10 which will admit solar radiation but minimize heat loss during collection operation not only by its insulating quality of poor heat conduction but also by stopping convection currents. Although cover 10 is illustrated as glass, any transparent material, preferably one transmitting the full range of the solar spectrum, may be used. Similarly, in some applications of the invention it may be desirable to double the exterior transparent cover or, in other applications, to make the cover removable to enhance radiation when the unit is used to dissipate heat.

The collection of heat in the device is accomplished by a sheet of heat conducting material 11 which has the ability to absorb light energy and convert that energy to heat and the ability to transfer heat so collected to an absorbing fluid medium. If the heat absorbing fluid is a gas, the heat conduction properties of collecting sheet 11 become less significant. The collecting sheet 11 is superimposed on foil 9, or insulation 8 if no foil is used and is preferably polished on its underside, i.e. the side toward the foil, to limit the escape of heat from that underside. The upper surface of heat conducting sheet 11 is preferably treated by any process, as for example painting, to produce a dull black finish or may be treated with a special solar receiving paint which absorbs the sun's rays readily while limiting the radiation of heat back to the atmosphere. According to experts in the art, dull black paint will absorb as much as 95 percent of the solar radiation incident upon the surface. A very thin coat of such paint will permit the conducting sheet to readily receive heat for transfer to a fluid heat absorbing medium for ultimate transfer to, and use in, a heat exchanger or other consuming means as, for example, radiators in a building.

In the embodiment of the invention illustrated in FIGS. 2 through 6, conducting sheet 11 is corrugated or otherwise distorted from planar form to a wavelike configuration with curved surfaced hills and valleys running the length of the unit, i.e. from one end wall to the other and parallel to side walls 7. This configuration is particularly efficacious when a liquid is used as the fluid heat absorbing and transferring medium because it permits the liquid to be trickled down the valleys of an inclined sheet 11 in controllable minute quantities with an even distribution of fluid over the area of the collecting sheet. By this controlled means a small quantity of fluid can steadily absorb heat from a large surface of collecting sheet to gain a maximum heat increase, i.e. to absorb a maximum amount of heat per unit volume. As specifically illustrated in FIG. 6, liquid 12 running in valleys 13 between hills 14 of sheet 11 will absorb heat from the valleys 13 and because of the high heat conductivity of the material of sheet 11, heat will flow from hills 14 to valleys 13 within the conducting sheet. As is obvious from FIG. 6, considerably less fluid is required than would be necessary to provide a constant, although thin, film of liquid over a planar conducting sheet. The canalization of the liquid by the corrugations as it gravitates across the conducting sheet is the most simple method of obtaining a constant predetermined low liquid to area ratio and prevents lateral or crosswise flow which, in the case of a planar configuration, could cause large areas of a heated collecting sheet to escape visit of the liquid reducing the quantity of heat transferred.

As illustrated in FIGS. 2 through 5, the heat absorbing liquid is provided to the unit by a fluid distribution system including distribution pipe 15 at its upper end and trough 16 at the lower end wall 6 which directs the liquid to discharge pipe 17 which protrudes through side wall 7 at 18 to provide for conveyance of heated liquid from the unit. Distribution pipe 15 is provided with a plurality of ports 19 spaced so as to locate one port, or a constant number of ports, at each valley of corrugated conducting sheet 11. Rate of flow and distribution of the liquid may be controlled by adjustment of the size of pipe 15, size of ports 19, number of ports, valving in pipe 15 and by any pressure or pump arrangement used with a completed solar heating system.

Preferably an interior or inner transparent sheet or cover 20 is used intermediate the heat collecting sheet 11 and the cover 10 to reduce uncontrolled reradiation and convection currents and to decrease the undesired effects of vaporization of the liquid used. This inner cover 20 may be of rigid or flexible material resistant to heat and vapor of the fluid, supported in the same manner as cover 10, but it is preferred that inner cover 20 be flexible and loosely secured to the inner portion of walls 6 over the pipe 15 and above trough 16 as illustrated in FIGS. 4 and 5 so as to droop onto the raised portions of collecting sheet 11. This preferred installation of the inner cover 20 reduces the volume of the atmosphere adjacent the collecting sheet 11 limiting the amount of water vapor that can exist in that atmosphere and thereby establishing a maximum quantity of heat that can be lost or suspended by vaporization of the heat absorbing liquid.

If it is desired to use a gas as the heat absorbing fluid, the fluid distribution and collection systems are reversed to be in accord with the physical fact that a heated gas will travel upwards.

As illustrated in FIGS. 2 and 3, a central supporting member or spacer 21 is used to give additional support to transparent cover 10. In the embodiment using a drooping flexible inner cover 20 as illustrated, spacer 21, by being placed on top of the inner cover 20 and supported by a ridge 14 of the corrugated collecting sheet, also serves to keep the inner cover 20 close to the sheet 11. The existence or frequency of use of spacers 21 obviously depends on the dimensions and materials in a particular embodiment of the invention. If the invention were to be used in a non-portable or non-tracking form, the most simple construction might consist of one very broad unit including several spacers 21 as needed for support of cover 10. However, smaller units may be made for plurality use to facilitate prefabrication and transportation to installation location. For this reason, the embodiment of FIGS. 2 and 3 is provided for interconnecting fluid supply components enabling units to be "plugged together" as illustrated by the additional dotted line unit of FIG. 3. Distribution pipe 15 is provided with a female connector 22 on one side while the return system is provided with an additional pipe 17 and a female connector 23.

A first modification of the heat collecting sheet is illustrated in FIGS. 7 and 8. Here collecting sheet 31 which has the same requirements as sheet 11 as to characteristics of light absorption, heat collection and heat conduction, accomplishes the liquid distribution objective of the invention by use of a different surface configuration. Sheet 31 is basically planar but is embossed so as to provide bosses 32, illustrated as, but not necessarily, regularly spaced constituting hills separated by interconnecting valleys. In this modification, the bosses 32 provide the "dry area" used to reduce the liquid volume to surface area ratio forming an important object of the invention. Flow of the liquid along the tortuous path dictated by the bosses causes a retardation of flow providing for a higher heat increase of the liquid.

Another modification is illustrated in FIGS. 9 and 10 wherein sheet 41, of the same characteristics with regard to heat as sheets 11 and 31, is both corrugated and embossed, having bosses 42, valleys 43, and ridges 44. Again, for the purposes of illustration, the bosses are arranged in regular pattern but may be located at random. In this arrangement a tortuous path within each valley is provided for the liquid gaining both advantages viz: canalization and impediment of flow.

Still another modification is illustrated in FIG. 11 where sheet 51 is arranged in a plurality of angularly disposed valleys 53 and ridges 54 by a crimped configuration. This modification has the capability of presenting planar surfaces to the solar radiation and thereby decreasing, on the average, the angles of incidence of the radiation; or as the angle of incidence increases, the configuration provides for the reflection of any reflected portion of the ray onto the opposing side of the valley rather than back to the atmosphere.

With the use of structure according to this invention, approximately 95 percent of the sun's rays are converted to heat, and a very large percentage of this heat is transferred to the fluid and immediately taken to the point of use or storage. If higher temperatures of the water are desired, it is merely necessary to increase the length of travel of the liquid through the valleys, i.e. to increase the length of the unit from top to bottom, or to decrease the rate of flow.

In certain instances the insulating material may be dispensed with or minimized, for example, if the solar heater unit is constructed as a portion of the roof of a building, the insulation of the roof may serve a dual function.

The unit will dissipate heat readily when operated at night or turned away from the sun, and is particularly effective when any transparent covers are removed from above the heat collecting sheet. Heat dissipation is great in this use because of evaporation of water flowing down the collecting sheet utilizing the principle that heat of vaporization absorbs tremendous quantities of heat.

The present invention has numerous advantages such as simplicity of construction, low cost, and high efficiency. It is substantially trouble-free in operation. The liquid automatically drains from the heater as soon as it is turned off and thereby avoids freezing in cold weather. No liquid-tight joints are necessary among the frame members. A wavelike, corrugated, embossed, or raised projection heat conductor material is very inexpensive to manufacture and light-weight to transport. The sun's rays usually strike substantial portions of the corrugated surface at small angles of incidence, even if the sun is to the left or right of a line normal to the surface. Thus, even a stationarily mounted unit is very efficient in absorbing light.

Since no part of the heat-collecting surface is very far from the heat-collecting fluid flowing down the valleys or between bosses, very little heat is radiated back to the atmosphere and the efficiency is extremely high. Even if one outlet of the distribution pipe should become clogged, the others continue to function and efficiency is only insignificantly impaired.

The present structure is also very effective when used to heat a gas since the corrugated surface has more square inches of exposed surface than a flat member providing greater metal-to-gas contact and therefore greater heat transfer.

In some installations the wavelike formation may be more pronounced, as channeled or crimped. Such form is particularly advantageous in adjustable collectors since the deep valleys or crimping keep the liquid flowing in closely spaced paths, even when the collector is tilted sidewise.

The present construction substantially eliminates the problem of condensation of liquid on the transparent material, experienced in many heat collectors. In addition to the action of inner cover 20, the higher temperatures remain at the lower end of the collector (when a liquid is used) and this high temperature keeps the glass or other transparent material warm enough to prevent condensation. At the upper end, where the liquid flowing in is colder, there is less evaporation, and the transparent material is warm enough that very little condensation is experienced. Whether one, two, or more layers of transparent material are used, condensation is at a minimum.

It is to be understood that the embodiment of the invention with its modification as illustrated and described is a preferred example and that various changes may be resorted to, or incorporation of many features old in the art may be resorted to, without departing from the spirit of the invention or the scope of the appended claims.

I claim:

1. A device for collection of heat from solar radiation and for radiation of heat comprising an insulated base; a heat collecting sheet comprising planar portions of substantial area superposed on said base; frame means at the perimeter of and inclosing said base and heat collecting sheet; a transparent cover substantially covering and in close proximity with said heat collecting sheet, the intervening spaces therebetween being further inclosed by said frame means; fluid distributing means for introducing a fluid at predetermined spaced intervals along said heat collecting sheet for transfer of heat between said fluid and said heat collecting sheet; means forming a part of said heat collecting sheet for controlling the course of flow of heat transferring fluid over said heat collecting sheet, said means comprising an irregular surface including a series of raised portions closely and uniformly spaced over said heat collecting sheet from frame to frame, said raised portions defining a plurality of narrow valleys forming a multiplicity of paths along which the fluid flows beneath said transparent cover; means for retrieving said fluid after it has flowed along and contacted said heat collecting sheet; and support means for said heat collecting sheet, said insulated base, and said transparent cover.

2. The apparatus of claim 1 wherein said planar portions comprise a flat sheet and wherein said raised portions comprise uniformly spaced bosses on said flat sheet, said bosses defining tortuous paths of flow for the fluid crossing said flat sheet.

3. The apparatus of claim 1 wherein said irregular surface comprises a plurality of angularly disposed intersecting planes disposed so that a substantial portion of solar radiation reflected from one of said planes is reflected onto another of said planes, the lines of intersection of said planes being substantially parallel and extending from the end of said sheet adjacent to said fluid distributing means to the end of said sheet adjacent to said fluid retrieving means.

(References on following page)

References Cited by the Examiner

UNITED STATES PATENTS

| | | | |
|---|---|---|---|
| 728,392 | 5/03 | Hague | 165—115 |
| 1,130,870 | 3/15 | Willsie | 126—271 X |
| 1,889,238 | 11/32 | Clark | 126—271 |
| 1,988,673 | 1/35 | Van Dijck et al. | 158—91 |
| 2,281,754 | 5/42 | Dalzell | 165—76 X |
| 2,553,073 | 5/51 | Barnett | 126—271 |
| 2,660,863 | 12/53 | Gerhart | 62—310 X |
| 2,680,437 | 6/54 | Miller | 126—270 |
| 2,680,565 | 6/54 | Lof | 126—271 X |
| 3,145,707 | 8/64 | Thomason | 126—271 |

FOREIGN PATENTS

| | | |
|---|---|---|
| 840,926 | 1/39 | France. |
| 1,023,132 | 12/52 | France. |
| 28,130 | 1907 | Great Britain. |

FREDERICK L. MATTESON, Jr., *Primary Examiner.*

JAMES W. WESTHAVER, *Examiner.*